United States Patent [19]
Gombos et al.

[11] Patent Number: 5,236,297
[45] Date of Patent: Aug. 17, 1993

[54] METHOD AND APPARATUS FOR UNLOADING NON-PALLETIZED CARGO UNITS OF BALES OF HAY

[75] Inventors: John M. Gombos, Bakersfield; Moshe Leashno, Long Beach, both of Calif.

[73] Assignee: A.C.X. Inc., Bakersfield, Calif.

[21] Appl. No.: 712,977

[22] Filed: Jun. 10, 1991

Related U.S. Application Data

[63] Continuation-in-part of Ser. No. 701,604, May 14, 1991, Pat. No. 5,090,177, which is a continuation of Ser. No. 526,186, May 18, 1990, abandoned, which is a continuation-in-part of Ser. No. 353,811, May 17, 1989, Pat. No. 5,001,974.

[51] Int. Cl.⁵ .............................................. B65G 67/02
[52] U.S. Cl. ..................................... 414/395; 414/343
[58] Field of Search ................ 414/395, 401, 402, 343, 414/345, 347, 538

[56] References Cited

U.S. PATENT DOCUMENTS

| | | | |
|---|---|---|---|
| 2,649,217 | 8/1953 | Mertes | 414/401 X |
| 3,666,127 | 5/1972 | Guyaux | 414/495 |
| 3,811,579 | 5/1974 | Black | 414/347 |
| 4,113,122 | 9/1978 | Lutz | 414/538 X |
| 4,783,190 | 11/1988 | Lövgren | 414/347 |

Primary Examiner—David A. Bucci
Assistant Examiner—Janice Krizek
Attorney, Agent, or Firm—Baker, Maxham, Jester & Meador

[57] ABSTRACT

An apparatus for unloading non-palletized units of cargo from cargo containers without docking facilities comprising an elongated mounting bracket for detachable attachment to a bottom door frame of a cargo container, and having a plurality of mounting studs extending outwardly therefrom, a pair of support rails having sockets at one end for receiving and detachably attaching to the mounting studs, and upstanding support legs at the other end for supporting the rails in a horizontal position, and a towing link for attachment at one end to a cargo unit to be pulled onto said rails and attachable at the other end to towing apparatus for towing the cargo unit onto said rails.

17 Claims, 2 Drawing Sheets

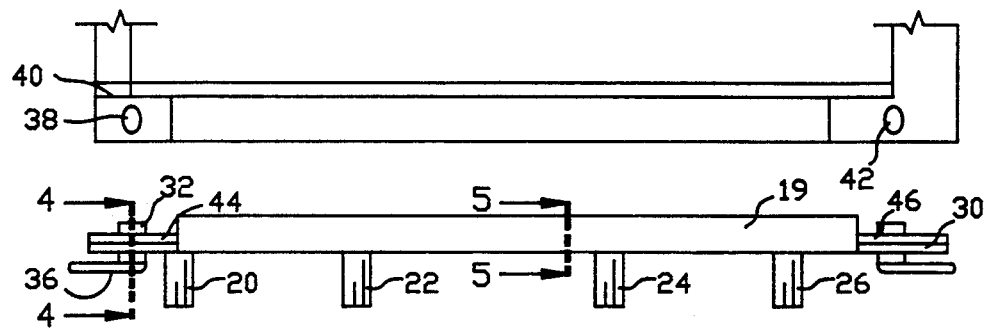
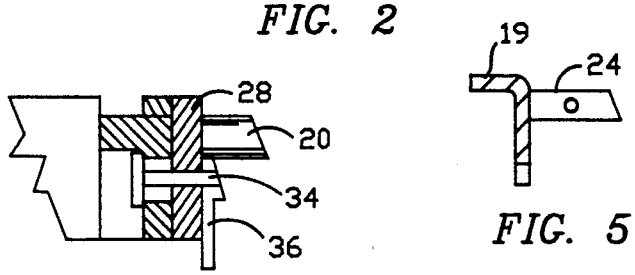
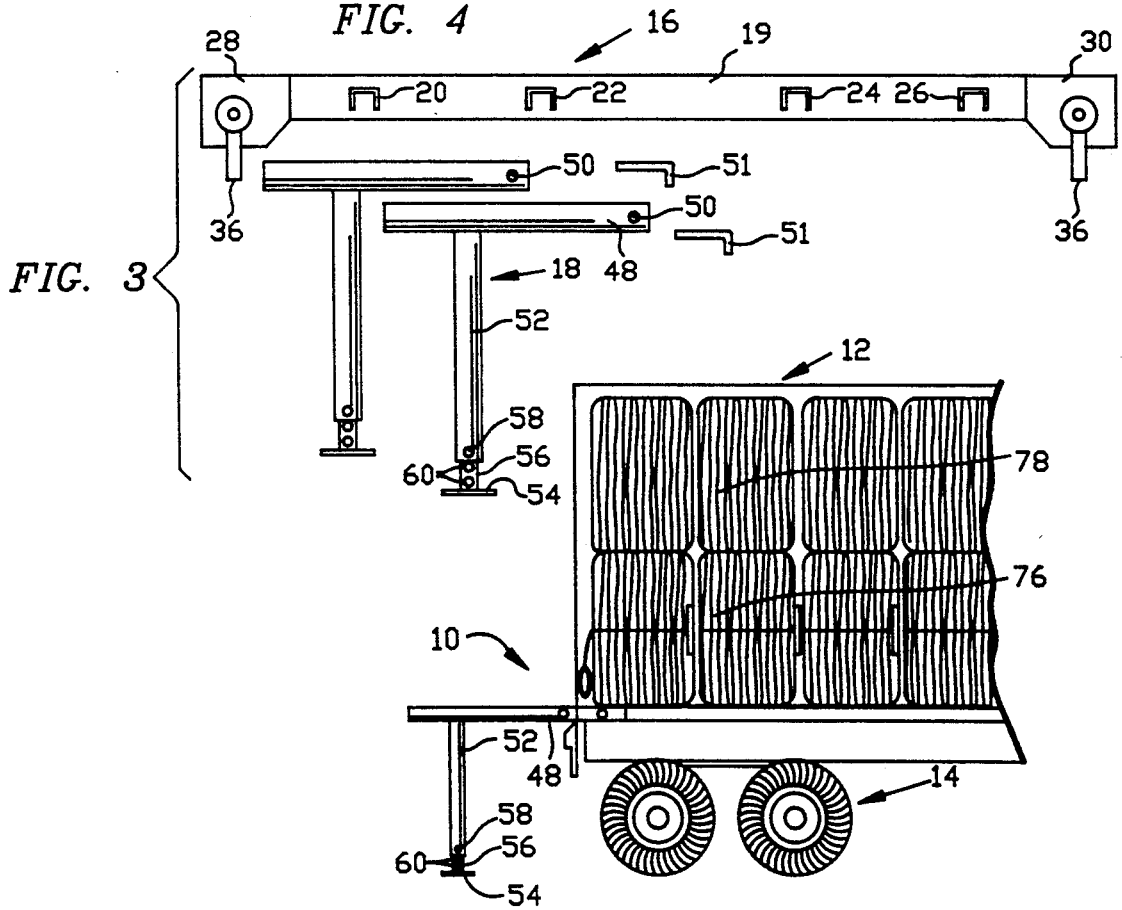

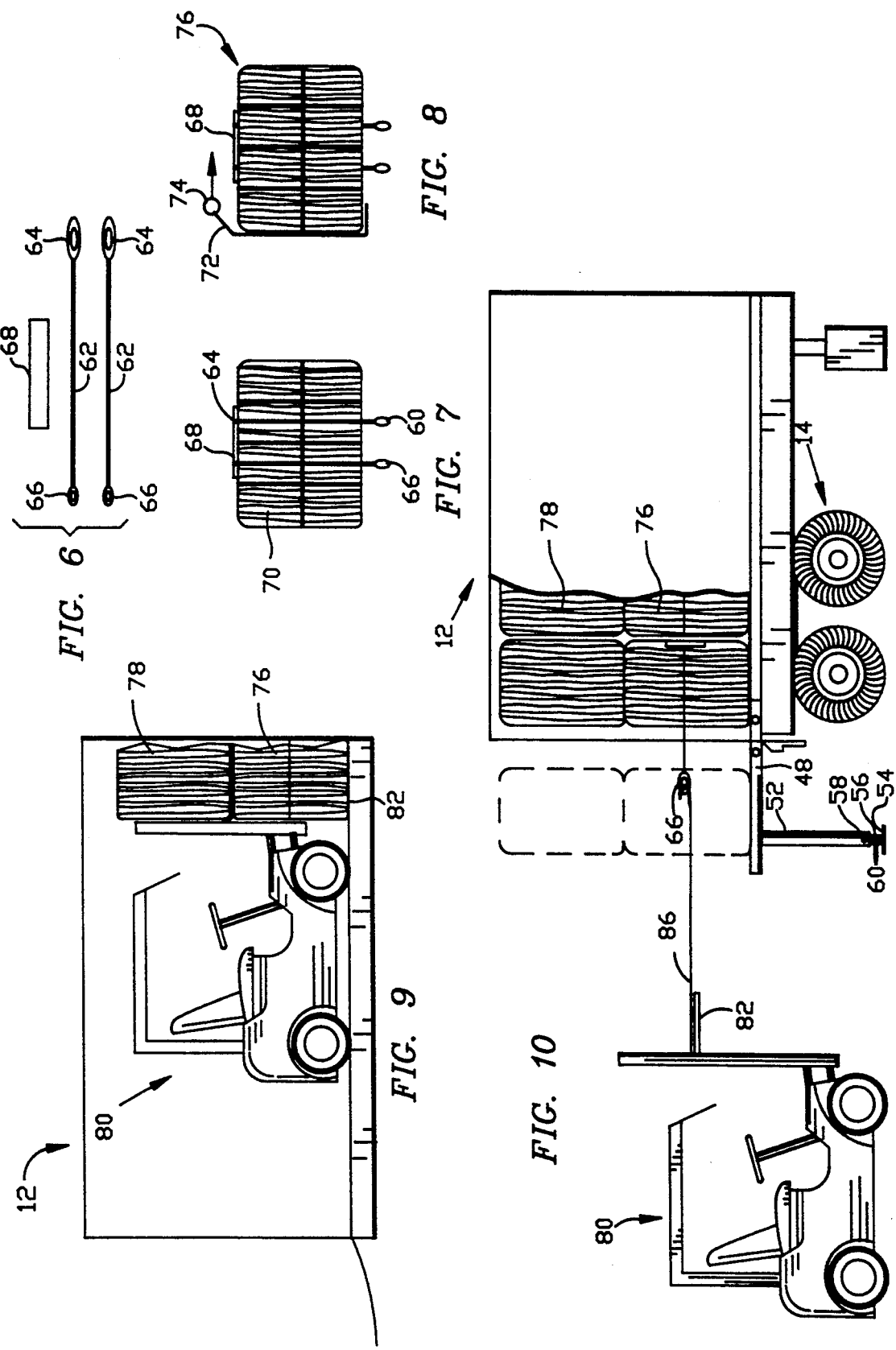

METHOD AND APPARATUS FOR UNLOADING NON-PALLETIZED CARGO UNITS OF BALES OF HAY

REFERENCE TO RELATED APPLICATIONS

The present application is a continuation-in-part of co-pending application Ser. No. 07/701,604, filed May 14, 1991, now U.S. Pat. No. 5,090,177, which was a continuation of Ser. No. 07/526,186, filed May 18, 1990, entitled "METHOD AND APPARATUS FOR UNITIZATION OF CARGO", now abandoned, and is a continuation-in-part of co-pending application Ser. No. 07/353,811, filed May 17, 1989, and entitled "HAY BALE RECOMPACTING SYSTEM" now U.S. Pat. No. 5,001,974.

BACKGROUND OF THE INVENTION

The present invention relates to the packaging and shipping of high density bales of hay, and pertains particularly to a method and apparatus for unloading of non-palletized units of multiple high density compact bales of hay from cargo containers in remote locations.

There has, in recent years, developed an international market for domestically produced hay. In order to meet the needs of this market, the hay must be packaged to provide for efficient and economical handling and shipping. Such economical handling and shipping requires that the packaging be in high density units capable of efficient packaging into shipping containers, efficient mechanical handling, and easily convertible to manual handling. This also requires that the bales also be of substantially uniform size and weight and formable into selectable uniform weight and size cargo units:

In the aforementioned U.S. Pat. No. 5,001,974, a system and method is disclosed for recompacting or further compacting bales of hay into higher density bales for shipping in international trade. The application also discloses cutting them into smaller, lighter weight units for easier manual handling. That system provides high density, smaller, more easily handled cargo units which are desirable for both ease of loading and fitting into cargo space and for manual handling. However, it is also desirable that these units be substantially equal or uniform in size and weight and be easily formed into selected uniform size and weight larger units for mechanical handling and shipping.

The typical harvesting of hay involves cutting it and drying it in the field, after which it is typically compressed and bound into bales for easier handling and storage. In the past, the typical field baled bale of hay for local use typically weighs about fifty-five to seventy-five pounds and occupies a space of about 48"×23"×17". The weight may vary by as much as 20% under certain circumstances. Bales of this size and weight are generally considered suitable for local manual handling and storage. However, they are considered too bulky for commercial markets and for long distance shipping, particularly for overseas shipping. For this reason, the standard commercial bale is about one-hundred ten pounds and of about the same dimensions as above. Twenty of such bales weigh a standard or metric ton of about twenty-two hundred pounds.

It has been found that such bales weighing fifty Kg or one-hundred ten pounds can be compacted into a single bale of about 18"×24"×20". This is about the same width and height and less than one-half (½) the length of the standard bale. This size and weight bale has a density of about twenty-two pounds per cubic foot. These can also be split into 18"×12"×20" bales and stacked and bound into fractions of one ton, one ton and multiple ton, such as two to twenty ton units for shipment. Also, two bales of the twenty-five Kg or fifty-five pounds weight standard dimension can be compacted into a single bale of the aforesaid size and weight. This recompacting or rebaling conserves considerable cargo space and provides easier handling units for manual handling, but requires some form of unitization for existing mechanical cargo handling and loading equipment, such as forklift trucks.

One form of unitization now used is the mounting of bales of hay on wooden pallets for handling with a forklift truck. The bales are frequently tied or attached to the pallet by means of straps, webbing, netting and by shrink wrap polymer films. However, the pallets take up valuable cargo space and weight and require separate handling and accommodation. They are also of a standard size and restrict or predetermine the size of a cargo unit. Moreover, they are an added cost, not only as a unit but as to handling and space requirements.

In our co-pending application Ser. No. 07/526,186, filed May 18, 1990, entitled "METHOD AND APPARATUS FOR UNITIZATION OF CARGO", we disclose a method of unitizing multiple bales of hay for handling by means of a forklift truck without the need for a pallet. That method is more fully discussed hereinbelow.

The shipping of cargo of this type in international trade requires flexibility in the size of cargo units, as well as a standardization that can be fit into different size cargo spaces. For example, most cargo is shipped in cargo containers of a standard 8'×8'×40'. However, when they reach their destination, they must fit cargo spaces that may vary from about four to about ten feet in width and from about five to about forty feet in length. They must also be in units of weight that are standard, and can be accommodated by vehicles at the destination, which can vary from one-quarter ton to ten ton capacity.

The cargo containers can be transported from shipping docks on a truck trailer chassis to the ultimate consumer, e.g. a dairyman or rancher. However, most dairies and ranches do not have suitable loading and unloading dock facilities to enable conventional forklift truck unloading.

It is desirable that improved means be available for the unloading of bales of hay in suitable size and weight unitized cargo from cargo containers in remote locations without dock facilities.

SUMMARY AND OBJECTS OF THE INVENTION

It is the primary object of the present invention to provide an improved system for the unloading of bales of hay in suitable size and weight unitized cargo units from cargo containers in remote locations without dock facilities.

In accordance with a primary aspect of the present invention, a cargo support frame comprises a pair of cargo support rails and an attachment bracket for attachment to the rear of a cargo container for supporting cargo units in a position for removal by means of a forklift truck. The cargo units are provided with towing attachment means to enable the units to be towed from the container onto the cargo support frame.

Another aspect of the invention comprises a method of unitizing a cargo of multiple high density hay bales into a non-palletized cargo unit capable of being handled by a forklift truck without a pallet, and including towing means comprising the steps of selecting a plurality of substantially identical high density bales of hay, arranging said plurality of bales of hay into a stack of at least one layer of multiple horizontal rows, embodying attaching means for a towing cable into the stack, and wrapping multiple layers of an elongated continuous sheet of pre-stretched polymeric film having a memory solely horizontally around said plurality of bales of hay for forcing the bales into binding engagement with laterally adjacent bales for forming a unit of cargo capable of being handled by forklift trucks without a pallet.

BRIEF DESCRIPTION OF THE DRAWING

The above and other objects and advantages of the present invention will become apparent from the following description when read in conjunction with the accompanying drawings wherein:

FIG. 1 is a side elevation view illustrating a shipping container with portions broken away and a portable dock in accordance with a preferred embodiment of the invention;

FIG. 2 is an enlarged end elevation view of a base frame of a shipping container and a mounting bracket of a portable dock in accordance with a preferred embodiment of the invention positioned for attachment thereto;

FIG. 3 is top plan view illustrating the unassembled components of a portable dock in accordance with the invention;

FIG. 4 is a view taken generally on line 4—4 of FIG. 2;

FIG. 5 is a view taken generally on line 5—5 of FIG. 2;

FIG. 6 is a top plan view of the unassembled components of a tow coupling kit of the invention;

FIG. 7 is a top plan view of the tow coupling kit of FIG. 6 in position on a partially assembled stack of hay arranged to be bound into a unit in accordance with the present invention;

FIG. 8 is a top plan view of the completed stack of hay of FIG. 7 arranged and in the process of being bound into a unit;

FIG. 9 is a side elevation view illustrating a shipping container with portions broken away and a cargo unit of FIG. 8 being loaded in accordance with the invention in use; and FIG. 10 is a side elevation view illustrating a shipping container with portions broken away showing a cargo unit of FIG. 8 being unloaded from the shipping container.

DETAILED DESCRIPTION OF A PREFERRED EMBODIMENT

Referring to the drawings, particularly to FIG. 1, there is illustrated a preferred embodiment of the apparatus of the present invention shown in use in carrying out the method of the invention. As illustrated in FIG. 1, a portable dock assembly, designated generally by the numeral 10, is shown attached to the rear end of a standard universal cargo container 12 that is supported on trailer unit 14. The portable dock assembly, as best seen in FIGS. 1-3, comprises an elongated base or mounting bracket 16 for attachment to the support frame of the shipping container, and a pair of generally T-shaped support rails, designated generally by the numeral 18, for detachable attachment to the base mounting bracket. The base or mounting bracket 16 comprises a central angle iron bar section 19 having a plurality of mounting blocks or studs 20, 22, 24 and 26 for receiving the ends of the rails 18, as will be explained.

The base mounting bracket 16 includes a pair of attachment assemblies, one at each end of the bar 19. These attachment assemblies each comprise a base plate 28 and 30, respectively, secured to the end of the bar 19 and extending longitudinally outward therefrom. These are identical in construction and only one of which will be specifically described. The coupling unit 28 comprises a substantially oval shaped disc 32 mounted on a forward end of a rotatable shaft 34 journaled in the plate 28, and a handle 36 on the outer end thereof for manual rotation thereof. The disc 32 is slightly smaller than and of a shape like that of locking holes or openings 38 in mounting blocks on the corners of the shipping container. When properly oriented, the disc 32 is inserted through the hole or opening 38, and is rotated by the handle 36 so that it is at ninety degrees to the orientation of the oval opening or hole 38, and thus locks against the back of container mounting bracket 40.

The coupling assembly 30 on the opposite end of the bar 19 is of an identical mirror image construction, and is adapted to engage a coupling hole or opening 42 on the opposite corner of the shipping container. As shown in FIG. 2, each of the mounting brackets 28 and 30 are provided with blocks 44 and 46 that extend over and aid in supporting the mounting bracket on the frame structure below the door opening of the shipping container.

The T-shaped support rails 18 in the illustrated embodiment are each formed of a downwardly facing C-channel section, with an upper elongated horizontally extending support rail portion 48 having an open forward end for coupling to a stud of the bracket 19, and including a cross or transverse throughbore 50 for receiving a pin 51. The rails may have any suitable cross sectional configuration, but preferably have a flat support surface of about nine (9) inches in width. Each of the blocks or studs 20-26 similarly have a pin receiving bore for registering with the bore 50 and receiving pin 51. The support rails include a downwardly depending leg 52, preferably near the outer end thereof, with a foot or base plate 54 thereon. An angled brace between the rail and leg may be provided if necessary. The legs 52 preferably include a telescoping lower portion 56 with suitable means, such as multiple bores 58 and 60 that enable the length of a leg to be adjusted. This is to provide for leveling of the rail portion 48 of the support rails. This compensates for uneven terrain on which the trailer carrying the cargo container may be parked.

As illustrated in FIGS. 1 and 10 the portable dock unit is attached to the base frame of the cargo container unit, and extends outward from the usual rear door thereof substantially even with the floor or deck thereof. This provides at least a pair of spaced apart support rails forming an extension of the container floor or deck on which a cargo unit can be pulled and supported. This portable dock unit enables the unloading of the cargo units from a trailer supported container in the absence of traditional docking facilities.

The present invention apparatus was designed to provide portable docking facilities for unloading shipping containers in remote locations where conventional docking facilities are not available. These permit the use of forklift trucks for lifting, handling and unloading cargo units, particularly unitized bales of hay as set forth in our parent U.S. Pat. No. 5,090,177. The present apparatus was designed to provide a system and method for shipment of units of cargo, particularly unitized bales of hay, with mechanical handling by a forklift truck from the loading dock to the ultimate consumer. To this end, bales of hay are unitized as in the parent U.S. Pat. No. 5,090,177, and are equipped with towing means and connecting means as illustrated in FIGS. 6–8.

Referring to FIG. 6, a tow coupling kit is illustrated comprising a pair of identical cables 62, each having a large loop 64 on one end and a small loop 66 on the other end. The large loop is to extend around a plank or board 68, which serves as anchoring device positioned behind the bales of hay in the stack, as shown in FIG. 7, with the connecting loops 66 extending across the layer of bales and extending forward of the front face of the stack. This towing and coupling connection need be provided only in the lower units of cargo, that is the bottom units.

Referring to FIG. 7, a stack is shown being formed by first laying down a first layer of multiple bales 70, arranged as illustrated, forming multiple rows of multiple bales in a rectangular array. The tow coupling unit is placed as illustrated, with the loop 64 extending over the opposite ends of the board or plank 68, and positioned with the cables lying on top of a center portion of the layer of bales, and the loop 66 extending forward of the front face of the stack. Thereafter, a second layer of bales 70 is placed on top of the first layer, thereby forming a multi-layer stack of multiple bales formed in multiple rows forming multiple rows of vertical columns of bales. The stack is then bound together and formed into a non-palletized unit of cargo consisting of multiple bales of hay bound together by a continuous lateral force directed inward on the peripheral sides of the stack. This continuous force is applied by pre-stretched polymeric film wrapped solely around the sides of a stack a sufficient number of times times, on the order of about four to about ten times for applying sufficient force to bind the bales together. The inward force forces the bales against laterally adjacent bales, and binds them together against vertical movement relative to one another and the binding sheet. This forms a palletized unit of cargo capable of being handled and lifted solely by the spaced apart tines of a forklift truck.

A towable cargo unit, as thus constructed, is illustrated by the numeral 76. Referring now to FIG. 9, this non-palletized unit ties a stack of bales of hay and is paired with a second non-palletized unitized stack 78, and loaded by means of a lift fork truck 80 having a pair of spaced apart tines 82, only one of which is shown, extending beneath and engaging the lower surface of the stack of hay. The forklift truck may be driven into the cargo shipping container, as shown in FIG. 9, placing the cargo units against the forward bulkhead of the container. The container may be resting on a ground surface, as shown in FIG. 9, or may be supported on a trailer unit, as in FIG. 10, with means such as a loading dock enabling the forklift truck to drive into the shipping container.

Referring to FIG. 10, there is illustrated the cargo shipping container positioned on a transport trailer in the absence of conventional docking facilities. In this situation, a forklift truck is capable of removing the cargo units disposed adjacent the door. However, it cannot remove those positioned forward of the door without some means as provided herein.

As illustrated in FIG. 10, unloading of the shipping container is easily accomplished with the loading of units of cargo as described above. In this instance, a cable 86 is attached at one end to the forklift truck 80, such as to the lift structure 82 or the like, and is attached at the other end to the loops 66 of the cables 62 embedded in the cargo unit 76. The lift truck 80 is then backed away from the rear of the container to tow the cargo units 76 and 78 from a position inside the shipping container 12 to a position as shown in phantom on top of the support rails 48. In this position, the forks 82 of the forklift truck 80 may be extended beneath the cargo unit 76, and engage the bottom surface thereof directly, and thereby lift the entire combination of units 76 and 78 from their position, and move it to a desired location, such as a warehouse or the like. Thus, the system provides an effective means for mechanically handling a cargo unit from its inception to its ultimate destination. This is carried out without the need for space consuming load pallets or difficult to apply top and bottom sheet type pallets.

In operation, when a shipping container 12 is positioned at its ultimate destination, a docking kit as illustrated in FIG. 3 is selected, and the base plate 16 is attached to the bottom rear frame of the shipping container. At least two support rail assemblies are then selected and attached to a pair of the studs 20-26. Thereafter, a forklift truck or other suitable towing vehicle is attached to the bottom cargo unit, as illustrated in FIG. 10, for towing the cargo unit onto the support rails 48. Thereafter, the forks of a forklift truck are engaged underneath the cargo unit, lifting it from its support on the rails, and placing it in its desired location. This, as previously noted, eliminates a considerable amount of manual handling of cargo and eliminates the need for a loading dock at the ultimate destination.

While we have illustrated and described our invention by means of specific embodiments, it should be understood that numerous changes and modifications may be made therein without departing from the spirit and scope of the invention as defined in the appended claims. We further assert and sincerely believe that the above specification together with the accompanying drawings contains a written description of the invention and the manner and process of making and using it, in such full, clear, concise, and exact terms as to enable any person skilled in the art to which it pertains, or with which it is most nearly concerned, to make and use the same, and further that it sets forth the best mode contemplated by us for carrying out the invention.

We claim:

1. A cargo support apparatus for aiding in unloading large cargo units from a cargo bed of a transport vehicle without docking facilities comprising in combination:

an elongated mounting bracket for extending along and detachable attachment to an outer peripheral surface of a support frame of a cargo bed of a transport vehicle;

a pair of separate and independent support rails, each having one end and another end and an upper support surface, said one end of each support rail having means for detachable attachment to said mounting bracket for positioning said support surface substantially even with said cargo bed and each support rail extending outward substantially normal to said bracket, and said other end having an upstanding support leg, each support leg having a lower end for directly engaging a ground surface for supporting said rails in a substantially horizontal position; and a towing link having an end for attachment to a cargo unit to be pulled onto said rails and another end for attachment to towing apparatus for towing said cargo unit onto said rails.

2. A cargo support apparatus according to claim 1 wherein said cargo bed is a standard cargo container and said mounting bracket includes male coupling means at the ends thereof for extending into and coupling to female coupling sockets of said standard cargo container.

3. A cargo support apparatus for aiding in unloading large cargo units from a standard cargo container of a transport vehicle without docking facilities comprising in combination:

an elongated mounting bracket having male coupling means at the ends thereof for extending into and coupling to female coupling sockets of said standard cargo container in order to detachably attach the mounting bracket to the rear of a support frame of said cargo container, said mounting bracket having horizontally outwardly extending mounting studs;

a pair of support rails having one end and another end, said one end of said support rails including sockets for engaging said mounting studs in order to detachably attach said support rails to said mounting studs and to position said support rails substantially even with the support deck of said cargo container, the other end of said support rails being supported by upstanding support legs for supporting said rails in a horizontal position; and a towing link having one end and another end, one end of said towing link being attachable to a cargo unit, the other end of said towing link being attachable to a towing apparatus for pulling said cargo unit onto said support rails.

4. A cargo support apparatus according to claim 3 wherein said support rails are tubular and said support legs are integral therewith.

5. A cargo support apparatus according to claim 4 wherein said support legs are adjustable in length.

6. A cargo support apparatus according to claim 5 for use in combination with cargo units consisting of multiple bales of hay bound together as a palletless cargo unit and having a pair of cables anchored to said unit and including a pair of loops extending from a side of said cargo unit for attachment to said towing link.

7. A cargo support apparatus according to claim 3 for use in combination with cargo units consisting of multiple bales of hay bound together as a palletless cargo unit and having a pair of cables anchored to said stack and including a pair of loops extending from a side of said cargo unit for attachment to said towing link.

8. A cargo support apparatus according to claim 1 wherein said towing link includes a pair of loops on a side of a cargo unit for attachment to said towing apparatus.

9. A cargo support apparatus according to claim 8 wherein said cargo unit is a unitized palletless stack of multiple bales of hay and said towing link includes a pair of cables anchored to said stack and including said pair of loops extending from a side of said cargo unit for attachment to an elongated flexible cable for attachment to a towing vehicle.

10. An apparatus for unloading non-palletized units of cargo from cargo containers without docking facilities comprising in combination:

an elongated mounting bracket having means on both ends thereof for detachable attachment to the bottom of a door frame of a cargo container, and having a plurality of mounting studs extending outwardly therefrom;

a pair of support rails having sockets at one end for receiving and detachable attachment to said mounting studs and upstanding support legs at the other end for supporting said rails in a horizontal position; and a towing link for attachment at one end to a cargo unit to be pulled onto said rails and attachable at the other end to towing apparatus for towing said cargo unit onto said rails.

11. A cargo support apparatus according to claim 10 wherein said support rails are tubular and said support legs are integral therewith.

12. A cargo support apparatus according to claim 11 wherein said support legs are adjustable in length.

13. A cargo support apparatus according to claim 12 wherein said towing link includes a pair of loops on a side of a cargo unit for attachment to said towing apparatus.

14. A cargo support apparatus according to claim 13 wherein said cargo unit is a unitized palletless stack of multiple bales of hay and said towing link includes a pair of cables anchored to said stack and including a pair of loops extending from a side of said cargo unit for attachment to said cable.

15. A cargo support apparatus for aiding in unloading large cargo units from a support deck of a standard cargo container of a transport vehicle without docking facilities comprising in combination:

an elongated mounting bracket having male coupling means at the ends thereof for extending into and coupling to female coupling sockets of said standard cargo container for detachable attachment to the rear of a support frame of said standard cargo container;

a pair of support rails, each having one end and another end and an upper support surface, said one end of said support rails having means for detachable attachment to said mounting bracket for positioning said upper support surface substantially even with the support deck of said standard cargo container, and the other end of said support rails having an upstanding support leg for supporting said rails in a horizontal position.

16. A cargo support apparatus according to claim 15 wherein said support rails are tubular and said support legs are integral therewith.

17. A cargo support apparatus according to claim 15, wherein said support legs are adjustable in length.

* * * * *